United States Patent
Blair et al.

(10) Patent No.: US 6,519,099 B1
(45) Date of Patent: Feb. 11, 2003

(54) LENS SYSTEM AND OPTOELECTRIC ALIGNMENT APPARATUS

(76) Inventors: Thomas H. Blair, 117 S. Bernal Rd., San Jose, CA (US) 95119; Diana Ching Chen, 181 Via Aragon, Fremont, CA (US) 94539; Phillip J. Edwards, 6721 Positano La., San Jose, CA (US) 95138; Siegfried Fleischer, 106470 Rosewood Rd., Cupertino, CA (US) 95014; Bradley S. Levin, 212 Bryant St., Palo Alto, CA (US) 94301; Oliver W. Northrup, 1336 Gilmore St., Mountan View, CA (US) 94040; Michael M. O'Toole, 5913 Foligno Way, San Jose, CA (US) 95138; Joseph John Vandenberg, 415 N. Lark Ellen Ave., West Covina, CA (US) 91791; Brett Matthew Zaborsky, 79 N. 10th St. Unit A, San Jose, CA (US) 95112

( * ) Notice: Subject to any disclaimer, the term of this patent is extended or adjusted under 35 U.S.C. 154(b) by 0 days.

(21) Appl. No.: 09/953,080

(22) Filed: Sep. 12, 2001

Related U.S. Application Data

(60) Provisional application No. 60/275,000, filed on Mar. 12, 2001.

(51) Int. Cl.[7] ............................. G02B 7/02; G02B 27/30
(52) U.S. Cl. ....................................... 359/819; 359/641
(58) Field of Search ................................. 359/819, 641, 359/719, 618, 664

(56) References Cited

U.S. PATENT DOCUMENTS

| | | | | |
|---|---|---|---|---|
| 5,684,901 A | * | 11/1997 | Gaebe | 385/33 |
| 5,745,625 A | * | 4/1998 | Aikiyo et al. | 385/94 |
| 6,269,203 B1 | * | 7/2001 | Davies et al. | 385/33 |
| 6,421,474 B2 | * | 7/2002 | Jewell | 385/14 |

* cited by examiner

Primary Examiner—Georgia Epps
Assistant Examiner—Saeed Seyrafi
(74) Attorney, Agent, or Firm—Parsons & Goltry; Robert A. Parsons; Michael W. Goltry

(57) ABSTRACT

The optoelectric alignment apparatus and lens system includes a glass ball positioned to receive light from a light source along an optical axis. A second lens is positioned to receive light from the glass ball and to supply the received light to a light receiving structure. The glass ball provides most of the optical power of the lens system so that the second lens provides only minor optical correction. The lens system is mounted by means of a molded plastic body that extends axially along the optical axis with the second lens molded into the body. The body includes a light inlet end and a light outlet in a surface lateral to the optical axis and defines a glass ball receiving cavity adjacent the light inlet end fixedly gripping the glass ball.

30 Claims, 2 Drawing Sheets

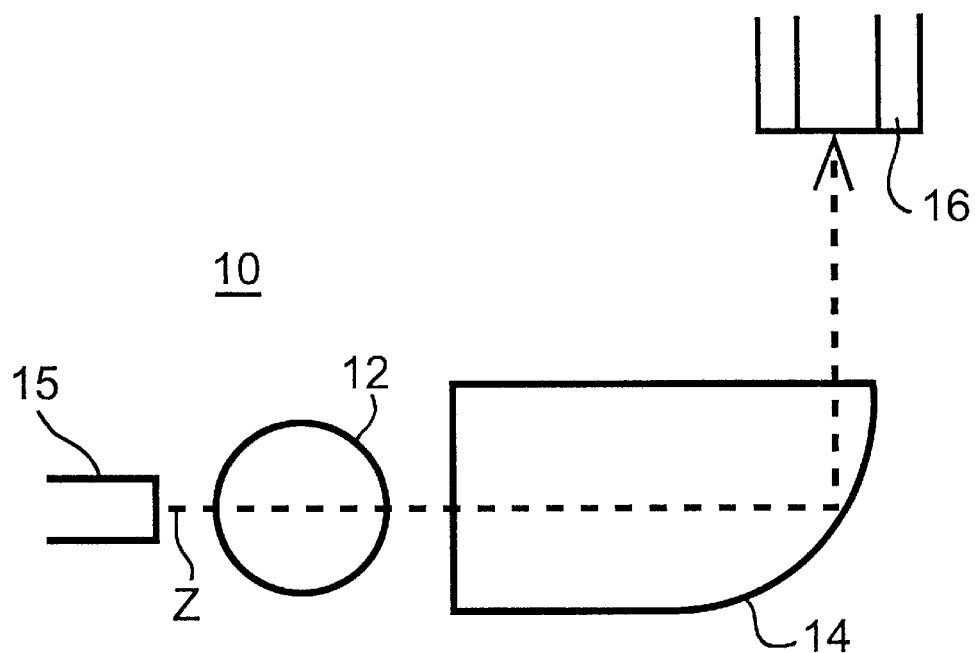
FIG. 1
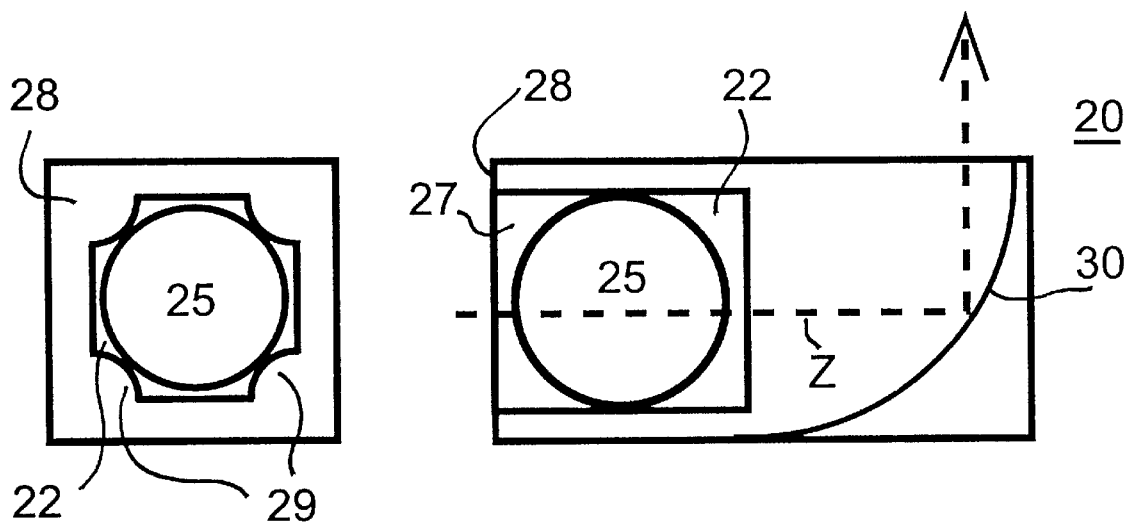
FIG. 3  FIG. 2

LENS SYSTEM AND OPTOELECTRIC ALIGNMENT APPARATUS

CROSS-REFERENCE TO RELATED APPLICATION

This application claims the benefit of U.S. Provisional Patent Application Ser. No. 60/275,000 filed Mar. 12, 2001 entitled OPTICAL/ELECTRICAL MODULE.

FIELD OF THE INVENTION

This invention relates to optical-to-electrical and electrical-to-optical apparatus including telecommunication modules.

More particularly, the present invention relates to lens systems in such apparatus and to alignment apparatus for the lens system.

BACKGROUND OF THE INVENTION

In optical-to-electrical and electrical-to-optical (hereinafter "optoelectric") apparatus, including modules used in the various communications fields, one of the most difficult problems that must be solved is the efficient transmission of light between a light generating device and an optical fiber or, alternatively, the transmission of light from the optical fiber to a light receiving device. Here (and throughout this description) it will be understood by those skilled in the art that the term "light" is a generic term which includes any electromagnetic radiation that can be modulated and transmitted by optical fibers or other optical transmission lines. Because optical fibers and the active regions of light generating devices and light receiving devices are very small, alignment of an optical fiber with a light generating device or a light receiving device is difficult and can be very work intensive and time consuming.

For example, one method used to align an optical fiber with a light generating device or a light receiving device is called active alignment. In this process a light is introduced at one end of the optical fiber and the other end is moved adjacent the active area of an operative light receiving device, while monitoring the output of the light receiving device, until a maximum output signal is received. Alternatively, an operative light receiving device is attached to one end of an optical fiber and the other end is moved adjacent the active area of an operative light generating device until a maximum output signal is received. In both instances the amount of time and effort required to obtain the optimum alignment is extensive.

In a perfect system, all of the light generated passes directly into an optical fiber and all of the light exiting an optical fiber is directed onto an active surface of a light receiving device. However, in the real world much of the generated light travels outwardly in a direction to miss the optical fiber and some of the light impinging on the optical fiber is reflected back into the light generating device. Much of the cause of this outwardly or misdirected light comes from poor alignment along the Z axis (the axis of light propagation) as well as misalignment in the X and Y axes (defining a plane perpendicular to the direction of light propagation). The outwardly or misdirected light can impinge on adjacent devices to produce unwanted cross-talk within the system. Also, the reflected light can be directed back into the light generating device or the optical fiber and can interfere with generated light to produce unwanted and troublesome modes or frequencies. Further, the loss of light through misdirection and/or reflection means that additional power must be used to produce sufficient light to transmit between various devices, thus reducing efficiency.

It would be highly advantageous, therefore, to remedy the foregoing and other deficiencies inherent in the prior art.

Accordingly, it is an object the present invention to provide new and improved lens systems.

Further, it is an object the present invention to provide new and improved optical alignment features for the new lens systems.

Another object of the present invention is to provide new and improved optical alignment features which reduce time and effort in alignment procedures.

And another object of the present invention is to provide new and improved optical alignment features which improve the efficiency of optical systems.

Still another object of the present invention is to provide new and improved lens systems with alignment features that reduce manufacturing tolerances and/or allow the use of machine assembly techniques.

SUMMARY OF THE INVENTION

Briefly, to achieve the desired objects of the present invention in accordance with a preferred embodiment thereof, provided is optoelectric alignment apparatus and lens system including a glass ball constructed to be positioned to receive light from a light source. A second lens is constructed to be positioned to receive light from the glass ball and to supply received light to a light receiving structure. The lens system has a predetermined amount of optical power with the first lens providing most of the optical power and the second lens providing only mild optical correction. Optical alignment apparatus is designed to fixedly hold the glass ball in a fixed position relative to the second lens.

In general, the light source is one of a laser, a light emitting diode, a light communicating optical fiber, or any other source of light for communication and the light receiving structure is any device that converts light energy into electrical energy, such as a photo-diode, a PIN diode, or one end of a light communicating optical fiber having such a device positioned at the other end. Because the first lens determines a major portion of the optical power of the apparatus, the second lens and the mounting apparatus can be formed of a low tolerance molded plastic part. Also, in some embodiments the second lenses can be formed to direct, impinging light received along a first axis, at an angle to the first axis and may include, for example, a curved reflecting surface.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 1 is a simplified schematic view of a combination lens system in accordance with the present invention;

FIG. 2 is a simplified sectional view of a mounting assembly for the lens system of FIG. 1, in accordance with the present invention;

FIG. 3 is simplified end view of the mounting apparatus of FIG. 2;

DETAILED DESCRIPTION OF PREFERRED EMBODIMENTS

Figure 4:
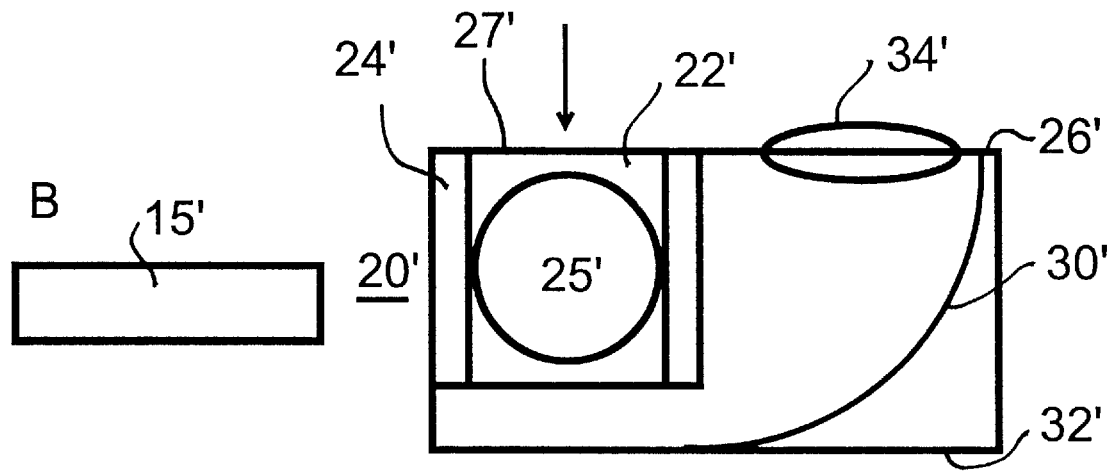
FIG. 4 is a simplified sectional view of another mounting assembly for the lens system of FIG. 1.

It will be understood by those skilled in the art that modules of the type discussed herein generally include a pair of channels, one of which receives electrical signals, converts the electrical signals to optical (light) beams by way of a laser or the like and introduces them into one end of an optical fiber, which then transmits the modulated optical beams to external apparatus. The second channel of the module receives modulated optical beams from an optical fiber connected to the external apparatus, conveys the modulated optical beams to a photo diode or the like, which converts them to electrical signals. Either of the two channels, optical-to-electrical or electrical-to-optical will hereinafter be generally referred to as "optoelectric" apparatus.

In the following description, the apparatus and methods can generally be used in either of the channels but, since the optical portions of the two channels are substantially similar, only one channel will be discussed with the understanding that the description applies equally to both channels. Also, throughout this disclosure the term "laser" is intended to denote any light source including, for example, a laser (including edge emitting laser, such as common varieties as the Fabry Perot (FP), Distributed Feedback laser (DFP), Distributed Bragg Reflector (DBR), or L-cavity laser, VCSELs, etc.), a light emitting diode, the end of a light communicating optical fiber, etc. and light receiving structures are intended to include any one of a photo-diode, a pin diode, an end of a light communicating optical fiber, etc.

The present invention provides a new and improved lens system and optoelectric alignment apparatus for the lens system. Turning to FIG. 1, a simplified schematic view is illustrated of an optoelectric lens system 10 in accordance with the present invention. As stated above, the term "optoelectric" is used herein to denote the fact that system 10 can be incorporated into either an optical-to-electrical or electrical-to-optical module or other apparatus. System 10, includes a glass ball 12 used in conjunction with a 90° reflecting lens 14. Glass ball 12 and reflecting lens 14, in this embodiment, form a complete optical system (although other optical elements may be added if desired). A light source 15, which may be for example any one of a laser, a light emitting diode, a light communicating optical fiber, etc., is positioned adjacent glass ball 12 and light emanating therefrom defines an optical axis Z. Light impinging upon reflecting lens 14 is directed at an angle to optical axis Z into a light receiving device 16, which is any device that converts light energy to electrical energy and may be, for example, any one of a photo-diode, a pin diode, an end of a light communicating optical fiber, etc.

By making the first lens element, glass ball 12, a curved surface, most of the optical power required to provide the desired results resides in glass ball 12. Thus, the remaining lenses 14, and any other desired optical elements, are not as significant (including shape, size, placement, etc.) and are included for minor optical corrections. Because glass ball 12 is constructed and positioned to have most of the optical power of the system, it affects the system more than less powerful components, such as reflecting lens 14. Further, because glass ball 12 affects the system more than less powerful components, it is constructed of material that is more stable with changes in temperature (i.e., relatively temperature insensitive compared to material forming other components in optical system 10) so that such changes in temperature have less effect on optical system 10. As an example, the material forming glass ball 10 has temperature characteristics that remain generally stable throughout the operating range of the optoelectric apparatus in which it is incorporated. Also lens 14, which has very little effect on the system (because of its low optical correction characteristics) can be a low tolerance molded plastic part. Thus, the optical system can be constructed relatively simply and will still have high stability during temperature changes.

Referring additionally to FIGS. 2 and 3, an embodiment is illustrated of an elongated molded assembly 20 with a cavity 22 having a glass ball 25 frictionally engaged therein. In this embodiment, an opening 27 is formed in end 28 of molded assembly 20 so that glass ball 25 is simply press fit into cavity 22 from end 28. In a preferred embodiment, cavity 22 is formed with inwardly rounded corners 29 (see FIG. 3) which tangentially engage glass ball 25 to reduce the manufacturing tolerances of cavity 22. A curved reflecting lens 30 is also included in molded assembly 20 spaced from glass ball 25. Here it will be understood that a curved reflecting surface is illustrated as a preferred embodiment but a plane (straight-through) optical lens or other optical element could be incorporated into molded assembly 30, if desired. Curved reflecting lens 30 can be a polished preformed metal element molded into assembly 20 or it can be a surface of assembly 20 that is formed during molding and then coated with a reflecting material (see for example lens 14 of FIG. 1).

In the operation of molded assembly 20, the entire assembly is mounted so that the longitudinal axis lies along the optical axis Z. Thus, light enters assembly 20 through opening 27 and passes through glass ball 25 to curved reflecting surface 30. Surface 30 reflects light from glass ball 25 at an angle to optical axis Z. In general, cavity 22 is constructed so that glass ball 25 is positioned against the rear surface for ease in assembly. However, cavity 22 can be formed with some additional axial length so as to leave room for axial movement or placement of glass ball 25 along the optical axis. This specific embodiment is good for reducing the tolerance of the depth of cavity 22, since a small change in distance between glass ball 25 and curved reflecting element 30 of is not critical.

Curved reflecting surface 30 can also be formed to compensate for an elliptical beam laser. As is known in the art, some lasers, such as vertical cavity surface emitting lasers (VCSELs), produce an elliptical, rather than round or circular, light beam. Much effort has gone into developing lasers that produce round beams but such lasers can be substantially more expensive than a standard laser which produces an elliptical beam. This elliptical light beam can cause some mode problems, alignment errors, and loss of light when focusing it into the round core of an optical fiber. In this embodiment, curved reflecting surface 30 can be formed to reflect the elliptical beam from a laser into a circular beam. Thus, less expensive lasers can be used with molded assembly 20.

An additional advantage that can be realized through the use of a curved reflecting surface, such as curved reflecting element 30, is the virtual elimination of astigmatism in the optical system. As is understood by artisans in the laser field, most lasers introduce astigmatism into the output beam. In most prior art optical systems additional lens are introduced into the light path to correct for this astigmatism. However, in the use of curved reflecting element 30 the astigmatism of a laser can be automatically compensated. Typically, the astigmatism can be measured, e.g. with polarized filters, etc., and curved reflecting element 30 can relatively easily be formed to include astigmatic compensation.

Figure 5:
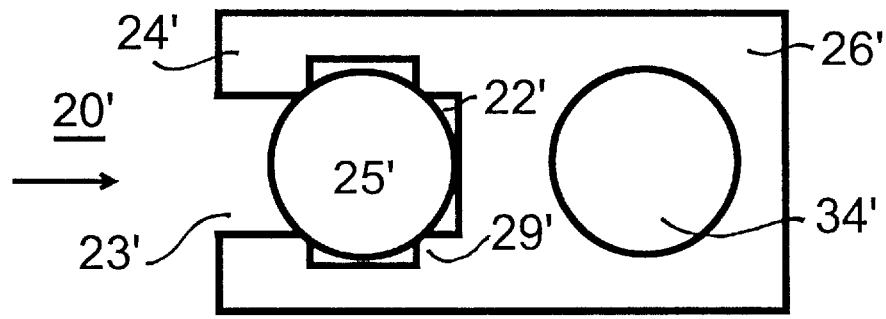
FIG. 5 is simplified top view of the mounting apparatus of FIG. 4.

Turning now to FIGS. 4 and 5, another embodiment is illustrated of an elongated molded assembly 20. In this embodiment, components similar to components of molded assembly 20 in FIGS. 2 and 3 are designated with similar numbers and a prime is added to all numbers to indicate the different embodiment. Molded assembly 20' defines a cavity 22' having a glass ball 25' frictionally engaged therein. In this embodiment, an opening 27' is formed in an upper surface 26' of molded assembly 20' so that glass ball 25' is simply press fit into cavity 22' from the top. An opening 23' can be formed in end wall 24' to allow light to pass directly to glass ball 25', if desired. For example, a laser or optical fiber can be positioned to but directly against glass ball 25' by providing opening 23'. However, since molded assembly 20' is generally formed of optically clear plastic or the like, opening 23' may be omitted in most instances.

In practice, assembly 20' is mounted on a lower surface 32' so that surface 26' is directed upwardly. Thus, this embodiment is constructed so that glass ball 25' can be easily inserted into cavity 22' after assembly 20' is in a mounted position. Alternatively, by forming opening 27' in upper surface 26', fabrication of the unit is simplified, since a large number of assemblies 20' can be manufactured in a common block and glass balls 25' inserted before the block is separated into individual units. This novel position and construction allows the use of machines for the complete assembly of the lens system. In a preferred embodiment, cavity 22' is formed with inwardly rounded corners 29' (see FIG. 5) which tangentially engage glass ball 25' to reduce the manufacturing tolerances of cavity 22'.

A curved reflecting lens 30' is also included in molded assembly 20' spaced from glass ball 25'. Here it will be understood that a curved reflecting surface is illustrated as a preferred embodiment but a plane (straight-through) optical lens or other optical element could be incorporated into molded assembly 30', if desired. Curved reflecting lens 30', for example, can be a polished preformed metal element molded into assembly 20' or it can be an external surface of assembly 20' that is formed during molding and then coated with a reflecting material (see for example lens 14 of FIG. 1). As described above, curved reflecting surface 30' can be formed to compensate for elliptical beams from lasers and/or to provide astigmatic compensation.

In either of the embodiments described above, additional optical elements, such as lens 34' (see FIGS. 4 and 5), can be included in assemblies 20 and/or 20', if desired. As an example lens 34' is included in surface 26' and may be simply molded into the plastic body of assembly 20' or could be an additional element molded into the assembly. Lens 34' could be included to provide additional or alternative astigmatic or elliptical beam compensation, additional power, or compensation for other problems in a specific system.

In both of the above embodiments, assemblies 20 and 20' are preferably formed of plastic and may be, for example, molded to simplify manufacturing. It should be understood that the term "plastic" is used herein as a generic term to describe any non-glass optical material that operates to transmit optical beams of interest therethrough and which can be conveniently formed into lenses and the like. Similarly, the term "glass" is defined as any material that is substantially temperature insensitive (i.e., stable throughout the operating temperature of the module), such as glass, crystalline material, or semiconductor material (e.g. silicon, oxides, nitrides, some ceramics, etc.). For example, in most optical modules used at the present time the optical beams are generated by a laser that operates in the infra-red band and any materials that transmit this light, including some oxides and nitrides, come within this definition.

Figure 6:
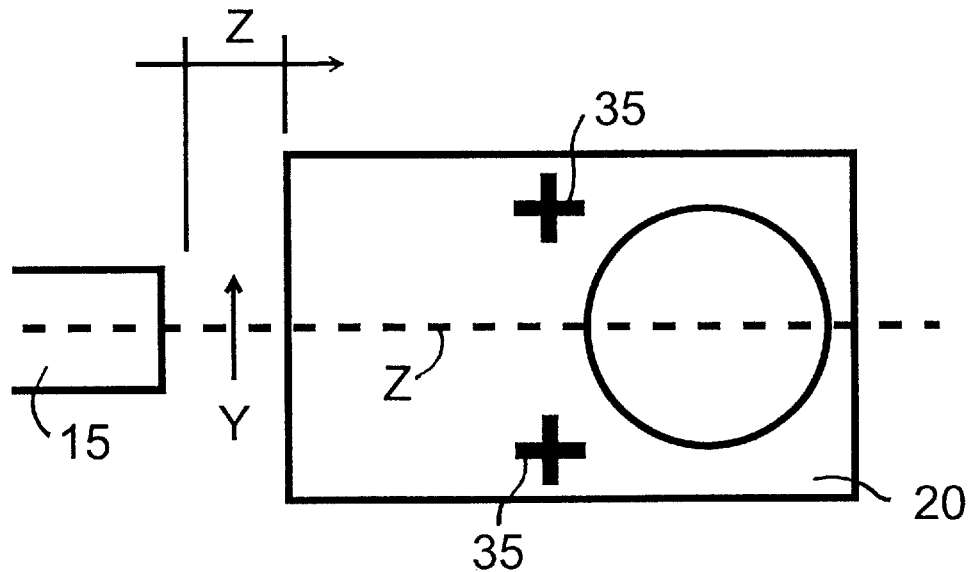
FIG. 6 is a plan view of a lens assembly including alignment fiducials in accordance with the present invention.

Turning now to FIG. 6, a plan view of an alignment feature for an optical component is illustrated. In many instances, optical components (e.g. assemblies 20 and 20' of FIGS. 2 and 4) are clear and a surface cannot easily be seen by automated placement apparatus used during automated assemble of the system. This can affect the positioning of the optical component which will in turn effect the operation of the entire system. To overcome this problem fiducial marks can be molded or otherwise provided on some or all of the optical surfaces to maintain an accurate relationship during automated assembly. In the specific example illustrated in FIG. 6, fiducials 35 are positioned on a surface of assembly 20. Fiducials 35 can take any convenient and desired shape but in the illustrated form are crossed opaque lines used to provide a reference in the Y and Z axes. During automated assembly, an imaging system is used to view fiducials 35 and align assembly 20 accurately in both the Y and Z axes.

Accordingly, a new and improved lens system and optical alignment features are disclosed which substantially reduce time and effort in alignment procedures and which improve the efficiency of optical systems. Because a pair of lenses are incorporated that are fixed relative to a light source and a light receiving structure, respectively, the distance along the Z axis between the pair of lenses is not critical. Also, because the light traveling between the pair of lenses is collimated, slight variances in the lateral position (X and Y axes) of the lenses is much less critical, since such variances simply produce a small amount of light loss.

Also, because the first lens includes a curved surface, most of the power is in the first lens and a temperature insensitive glass ball is used. Since only minor optical correction is provide by the remaining optical elements, these elements can be formed of much less sensitive and costly material. Thus, manufacturing tolerances can be substantially reduced, substantially reducing manufacturing time, labor, and costs. Further, the new and improved lens system and optical alignment features allow the use of a variety of different components and component materials.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Optoelectric alignment apparatus and lens system comprising:
    a first lens constructed to be positioned to receive light from a light source, the first lens including a glass ball;
    a second lens structure, including a reflecting surface, constructed to be positioned to receive light from the first lens and to supply received light to a light receiving structure wherein the second lens structure is formed to direct impinging light received along a first axis at an angle to the first axis;
    the lens system having a predetermined amount of optical power substantially determined by choosing a first distance between the light source and the first lens with the first lens providing more of the optical power than the second lens structure; and
    an optical alignment apparatus designed to fixedly hold the glass ball in a fixed position relative to the second lens structure.

2. Optoelectric alignment apparatus and lens system as claimed in claim 1 wherein the first lens is placed a first distance from light source including one of a laser, a light emitting diode, and a light communicating optical fiber.

3. Optoelectric alignment apparatus and lens system as claimed in claim 1 wherein the light receiving structure is a device that converts light energy into electrical energy.

4. Optoelectric alignment apparatus and lens system as claimed in claim 3 wherein the light receiving structure is one of a photo-diode and a light communicating optical fiber.

5. Optoelectric alignment apparatus and lens system as claimed in claim 1 wherein the glass ball is formed of material that is relatively temperature insensitive compared to material forming the second lens.

6. Optoelectric alignment apparatus and lens system as claimed in claim 5 wherein the temperature insensitive material forming the glass ball includes one of glass, crystalline material, and semiconductor material.

7. Optoelectric alignment apparatus and lens system as claimed in claim 1 wherein the second lens is formed of plastic.

8. Optoelectric alignment apparatus and lens system as claimed in claim 7 wherein the second lens is included in a low tolerance molded plastic part.

9. Optoelectric alignment apparatus and lens system as claimed in claim 8 further including alignment fiducials formed in the molded plastic part for use during automated assembly.

10. Optoelectric alignment apparatus and lens system as claimed in claim 1 wherein the reflecting surface of the second lens structure includes a curved reflecting surface.

11. Optoelectric alignment apparatus and lens system as claimed in claim 10 wherein the optical alignment apparatus includes an elongated body that extends axially along an optical axis defined by the direction of light emanating from the light source, the body further having a light inlet end and a light outlet in a surface lateral to the optical axis.

12. Optoelectric alignment apparatus and lens system as claimed in claim 11 wherein the body is constructed to define a glass ball receiving cavity adjacent the light inlet end designed to receive and fixedly grip the glass ball.

13. Optoelectric alignment apparatus and lens system as claimed in claim 12 wherein the glass ball receiving cavity includes a glass ball receiving opening directed toward the light inlet end.

14. Optoelectric alignment apparatus and lens system as claimed in claim 12 wherein the body includes parallel opposed surfaces on opposite sides of the optical axis, one of the opposed surfaces being a mounting surface for the body and the other opposed surface defining a glass ball receiving opening in communication with the glass ball receiving cavity.

15. Optoelectric alignment apparatus and lens system as claimed in claim 12 wherein the body further includes a light reflecting optical element positioned adjacent the glass ball receiving cavity along the optical axis to direct light at an angle from the optical axis to the light outlet.

16. Optoelectric alignment apparatus and lens system as claimed in claim 15 wherein the light reflecting optical element is curved to operate as a lens.

17. Optoelectric alignment apparatus and lens system as claimed in claim 16 wherein the light reflecting curved optical element is formed to include astigmatic compensation.

18. Optoelectric alignment apparatus and lens system as claimed in claim 16 wherein the light reflecting curved optical element is formed to include elliptical beam compensation.

19. Optoelectric alignment apparatus and lens system as claimed in claim 12 wherein the glass ball receiving cavity in the body is constructed with a generally square cross-section.

20. Optoelectric alignment apparatus and lens system as claimed in claim 19 wherein the glass ball receiving cavity in the body further includes protrusions designed to bear against and frictionally engage the glass ball.

21. Optoelectric alignment apparatus and lens system comprising:
    a glass ball lens positioned for receiving light from a light source, the received light defining an optical axis;
    a second lens positioned to receive light from the glass ball lens and to supply received light to a light receiving structure;
    the lens system having a predetermined amount of optical power with the glass ball lens providing more of the optical power than the second lens; and optical alignment apparatus designed to fixedly hold the glass ball in a fixed position relative to the second lens, the optical alignment apparatus including an elongated body that extends axially along the optical axis, the second lens being integrated into the body along the optical axis, the body including a light inlet end and a light outlet in a surface lateral to the optical axis, the body defining a glass ball receiving cavity adjacent the light inlet end receiving and fixedly gripping the glass ball; and wherein the second lens includes a light reflecting optical element positioned adjacent to the glass ball receiving cavity along the optical axis to direct light at an angle from the optical axis to the light outlet.

22. Optoelectric alignment apparatus and lens system as claimed in claim 21 wherein the glass ball receiving cavity includes a glass ball receiving opening directed toward the light inlet end.

23. Optoelectric alignment apparatus and lens system as claimed in claim 21 wherein the body includes parallel opposed surfaces on opposite sides of the optical axis, one of the opposed surfaces being a mounting surface for the body and the other opposed surface defining a glass ball receiving opening in communication with the glass ball receiving cavity.

24. Optoelectric alignment apparatus and lens system as claimed in claim 21 wherein the light reflecting optical element is curved to operate as a lens.

25. Optoelectric alignment apparatus and lens system as claimed in claim 24 wherein the light reflecting curved optical element is formed to include astigmatic compensation.

26. Optoelectric alignment apparatus and lens system as claimed in claim 24 wherein the light reflecting curved optical element is formed to include elliptical beam compensation.

27. Optoelectric alignment apparatus and lens system as claimed in claim 21 wherein the body is formed of molded plastic with the second lens molded therein.

28. Optoelectric alignment apparatus and lens system as claimed in claim 27 further including alignment fiducials formed in the molded plastic part for use during automated assembly.

29. Optoelectric alignment apparatus and lens system as claimed in claim 21 wherein the glass ball receiving cavity in the body is constructed with a generally square cross-section.

30. Optoelectric alignment apparatus and lens system as claimed in claim 29 wherein the glass ball receiving cavity in the body further includes protrusions designed to bear against and frictionally engage the glass ball.

* * * * *